Patented Sept. 29, 1931

1,824,961

UNITED STATES PATENT OFFICE

WALTER E. LAWSON, OF WILMINGTON, DELAWARE, ASSIGNOR TO E. I. DU PONT DE NEMOURS & COMPANY, OF WILMINGTON, DELAWARE, A CORPORATION OF DELAWARE

CELLULOSE DERIVATIVE COMPOSITIONS

No Drawing. Application filed September 13, 1928. Serial No. 305,873.

This invention relates to the art of softeners, and more particularly to softeners for cellulose derivatives.

It is an object of this invention to produce compositions containing cellulose derivatives which will form films having a high degree of flexibility.

It is also an object of this invention to provide new and useful coating compositions.

I have found that acetals in which the alcohol constituents contain more than one ether group and having relatively low vapor pressures are compatible with various cellulose derivatives and that they make excellent softeners or plasticizers for such materials, and for cellulose acetate in particular.

Examples of compositions embodying my invention are set forth below by way of illustration and not as a limitation.

Example 1

| | Parts by weight |
|---|---|
| Cellulose acetate | 10 |
| Acetal of the monoethyl ether of diethylene glycol | 3 |
| Solvent: acetone, 60%; methyl ether of ethylene glycol, 30%; diacetone alcohol 10% | 100 |

This yields films of exceptional softness, flexibility, and clarity. Tests extending over a period of three months showed no change in these properties.

Example 2

| | Parts by weight |
|---|---|
| Pyroxylin | 15 |
| Acetal of the monoethyl ether of diethylene glycol | 4.5 |
| Solvent: ethyl acetate, 80%; butyl acetate, 20% | 80.5 |

The film secured by evaporation of this solution was clear and tough.

Example 3

| | Parts by weight |
|---|---|
| Pyroxylin | 15 |
| Acetal of the butyl ether of diethylene glycol | 4.5 |
| Solvent: ethyl acetate, 80%; butyl acetate, 20% | 80.5 |

This produces a clear, tough and flexible film.

Example 4

| | Parts by weight |
|---|---|
| Benzyl cellulose | 10 |
| Acetal of the monoethyl ether of diethylene glycol | 2 |
| Solvent: toluene, 50%; butyl alcohol, 50% | 88 |

This composition gave a satisfactory film which was both clear and flexible.

Example 5

| | Parts by weight |
|---|---|
| Ethyl cellulose | 10 |
| Acetal of the monoethyl ether of diethylene glycol | 3 |
| Solvent: benzene, 50%; toluene, 50% | 87 |

The results were similar to those obtained with other cellulose derivatives.

Example 6

A spraying lacquer containing the acetal of the ethyl ether of diethylene glycol which has been found to give tough, adherent films, has the following described composition:

| | Parts by weight |
|---|---|
| Cellulose acetate | 12 |
| Acetal of the monoethyl ether of diethylene glycol | 6 |
| Elemi resin | 3 |
| Solvent: acetone, 17%; denatured alcohol, 9%; ethyl acetate, 12%; acetone oils, 20%; toluene 20; methyl ether of ethylene glycol, 22% | 179 |

The acetal of the monoethyl ether of diethylene glycol referred to above has the formula $$CH_3CH(OCH_2CH_2OCH_2CH_2OCH_2CH_3)_2$$

and a boiling point of 140–145° C. under a pressure of 14 mm. This may be prepared in various ways as indicated in the copending application filed of even date herewith by Julius A. Nieuwland, Serial No. 305,867, but the preferred method is as follows:

A 20% solution of fluoboric acid in ethyl alcohol weighing 10 grams is warmed with two grams of mercuric oxide until a portion of the mercuric oxide has gone into solution.

To this catalyst mixture is then added 200 grams of the ethyl ether of diethylene glycol, and acetylene is passed in until an increase in weight of 20 grams occurs, corresponding to the absorption of one-half gram mole acetylene per gram mole of the ethyl ether of diethylene glycol. When the rate of the reaction decreases, additional mercuric oxide is added in two gram portions, not more than 10 to 12 grams being required for a charge of this size. On the completion of the reaction the product is neutralized with saturated potassium carbonate solution, dried with anhydrous potassium carbonate, and distilled yielding the acetal in a high state of purity.

Instead of using the acetal of the monoethyl ether of diethylene glycol, its homologs, such as the acetals of the methyl, propyl or butyl ethers of diethylene glycol, may be employed and may be made in a similar manner.

I prefer, however, to use the acetal of the monoethyl ether of diethylene glycol on account of its low cost, satisfactory compatibilities with various cellulose derivatives, tendency to favor adhesion of film, and retention of plasticizer in the film, thus giving increased duration of flexibility.

As many apparently widely different embodiments of this invention may be made without departing from the spirit and scope thereof, it is to be understood that I do not limit myself to the specific embodiments thereof except as defined in the appended patent claims.

I claim:

1. A composition comprising a cellulose derivative and, as a softener therefor, an acetal of an alkyl ether of diethylene glycol.

2. A composition comprising a cellulose derivative and, as a softener therefor, the acetal of the monoethyl ether of diethylene glycol.

3. The composition of claim 2, in which the cellulose derivative is cellulose acetate.

4. A composition comprising a cellulose derivative, an acetal of an alkyl ether of diethylene glycol, and a solvent.

5. The composition of claim 4, in which the cellulose derivative is cellulose acetate.

6. A composition comprising 12 parts by weight of a cellulose derivative, 6 parts by weight of an acetal of an alkyl ether of diethylene glycol, and a solvent.

7. The composition of claim 6, in which the cellulose derivative is cellulose acetate.

8. A composition comprising 12 parts by weight of a cellulose derivative, 6 parts by weight of the acetal of the monoethyl ether of diethylene glycol, and a solvent.

9. The composition of claim 8, in which the cellulose derivative is cellulose acetate.

In testimony whereof, I affix my signature.

WALTER E. LAWSON.